United States Patent Office 3,791,999
Patented Feb. 12, 1974

---

3,791,999
PROCESS FOR PREPARING A CROSS-LINKED POROUS COPOLYMER
Yutaka Fuchiwaki, Tokyo, and Takashi Nishikaji, Yokohama, Japan, assignors to Mitsubishi Chemical Industries, Limited, Tokyo, Japan
Filed Dec. 16, 1971, Ser. No. 208,689
Claims priority, application Japan, Dec. 19, 1970, 45/114,712
Int. Cl. C08f 15/02, 47/08
U.S. Cl. 260—2.5 M        10 Claims

ABSTRACT OF THE DISCLOSURE

A cyano group-containing cross-linked porous copolymer, which is large in surface area and high in porosity and high in adsorptivity for polar substances, is obtained by polymerizing a monovinyl cyanide, or a monovinylidene cyanide, monomer, with a polyvinyl monomer, in the presence of an organic solvent which is inert to these monomers, and which functions both as a solvent therefor and as a swelling agent for the resulting copolymer, and with a linear monovinyl polymer, which is capable of forming a homogeneous liquid phase with the monomers and the solvent, and thereafter removing the linear polymer from the resulting copolymer by extraction.

BACKGROUND OF THE INVENTION

Field of the invention

The present invention relates to a process for preparing a cross-linked porous copolymer containing a cyano group. More particularly, the present invention relates to a process for preparing a cyano group-containing cross-linked porous copolymer, which is large in surface area and high in porosity, and moreover is high in absorptivity for polar substances.

Description of prior art

In general, numerous processes are known for preparing insoluble porous copolymers from monovinyl monomers and polyvinyl monomers. For instance, in one process (1) it is known to prepare a cross-linked porous copolymer by partially polymerizing a monovinyl monomer, wherein the resulting polymer is soluble in the monomer, or by dissolving a linear polymer previously produced in a monovinyl monomer, adding a polyvinyl monomer thereto, if necessary, with a plasticizer or reinforcing agent, and copolymerizing a polyvinyl monomer with the remaining monovinyl monomer, and subsequently extracting the added linear polymer, plasticizer, etc. with a suitable organic solvent from the copolymer produced, and (2) a process for preparing a porous copolymer by reacting a monovinyl monomer and a polyvinyl monomer in an organic solvent which is inert to the polymerization reaction and which is capable of swelling the copolymer produced.

However, neither of these processes are completely satisfactory, either because the partial polymerization is not possible, or is difficult, or because the resulting product is not completely satisfactory.

For instance, it is very difficult to prepare a cross-linked copolymer by these processes, which is large in surface area, high in porosity and large in pore dimension, especially when the copolymer is a cyano group-containing copolymer. Cyano group-containing mono-vinyl monomers cannot be only partially polymerized, since they are generally incapable of dissolving the resulting polymer produced therefrom. Moreover, when suspension polymerization techniques are used in preparing the copolymer, the ability to form spheres is very difficult, and a copolymer of small particle size cannot be obtained, since the viscosity of the monomer phase will increase as the quantity of polymer dissolved in the monomer mixture is increased, although the reaction can be effected by block polymerization techniques.

Copolymers obtained by the latter process (2) are characterized by a high degree of volume expansion as compared with the non-swollen copolymer. This high degree of expansion is usually detrimental to the copolymer for practical use.

A need exists, therefore, for a cross-linked porous copolymer and for a process of producing the same, which is large in surface area, high in porosity and large in pore diameter, and which has excellent physical characteristics.

SUMMARY OF THE INVENTION

Accordingly, one object of the present invention is to provide an industrially attractive process for preparing a cross-linked copolymer which is useful as a separating agent or an adsorbent, and such object can be easily attained by copolymerizing a monovinyl cyanide, or monovinylidene cyanide, monomer with a polyvinyl monomer, in the presence of an organic solvent, which is inert to these monomers, and which functions both as a solvent therefor and as a swelling agent for the resulting copolymer, and with a linear monovinyl polymer, which is capable of forming a homogeneous liquid phase with the monomers and the solvent, and thereafter removing the linear polymer from the resulting copolymer by extraction.

DETAILED DESCRIPTION OF THE PREFERRED EMBODIMENTS

Figure 1:
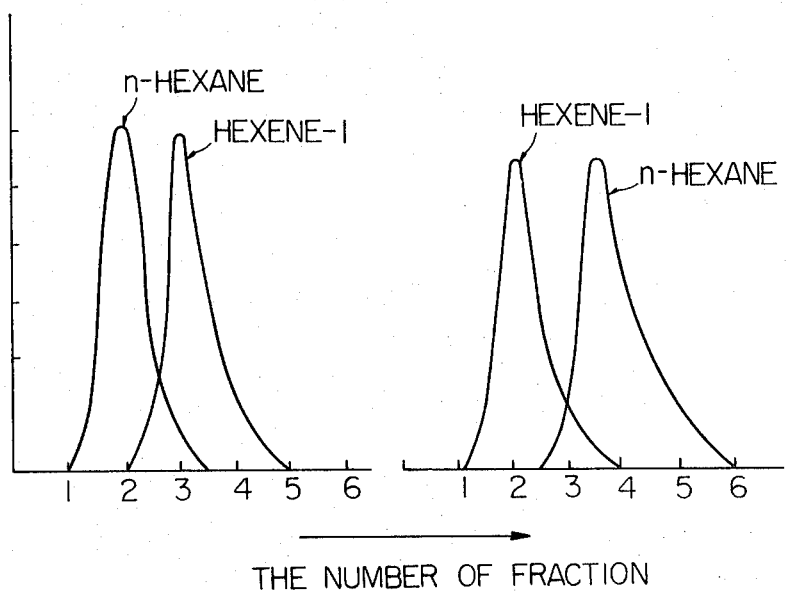
FIG. 1 is a curve of the amount of flow showing the effect of the copolymer obtained by the present invention for separation of hydrocarbons by column chromatography; and, FIG. 2 is a curve of the amount of flow showing the effect of the copolymer of the present invention for separation of sugars by gel permeation chromatography.

The monovinyl cyanide, or monovinylidene cyanide monomer used as the reactant in the process of the present invention may be acrylonitrile or methacrylonitrile. Suitable polyvinyl monomers used as a cross-linking agent in the present invention include the polyvinyl aromatic compounds, such as divinyl benzene, divinyl toluene, divinyl naphthalene, trivinyl benzene, and the like, and the polyvinyl aliphatic compounds, such as ethylene glycol diacrylate, ethylene glycol dimethacrylate, and the like.

The amount of polyvinyl monomer used in the present process is generally 20 to 50% by weight of the total vinyl monomers, although the amount may be varied depending upon the desired properties of the copolymer. However, when the amount of polyvinyl monomer is too high, the polarity, which is a characteristic of the resin of the present invention, will be decreased and thereby the objects of the present invention will, undesirably, be lost.

The solvents used should be capable of functioning to increase the surface area of the copolymer produced, and should be capable of dissolving the mixture of monomer reactants. It should be capable of swelling the copolymer produced and should be inert to the copolymerization reaction. Suitable such solvents include the aromatic hydrocarbons, such as benzene, toluene, etc. If the reaction is carried out by suspension polymerization techniques, a water-insoluble or difficultly soluble solvent, should be used. The amount of solvent used will vary depending upon the particular polyvinyl monomer used and the polymer added. In general, the quantity of solvent can be decreased with an increase in polyvinyl monomer. A relatively large amount of solvent should be used when the amount of polyvinyl monomer is small. Therefore, the amount of solvent used is usually within the range of 20 to 300% (vol./g.-monomer) of the monomer mixture, and preferably 50 to 150%, although the amount cannot be limited to any special range.

Any linear monovinyl polymer may be used herein regardless of the reactant monomers used. For instance, suitable such polymers include polystyrene, polymethyl styrene, polyvinyl acetate, polymethylmethacrylate, polymethylacrylate, etc. It is only necessary that the polymer be selected such that it is capable of forming a homogeneous liquid phase when mixed with the monomers and solvent. The degree of polymerization of the polymer used is usually about 50 to 5,000, and preferably about 50 to 1,000, depending upon its solubility. The quantity of such polymer may optionally be selected depending upon the desired properties desired for the resulting copolymer. In general, where the polymer is used in excessive quantities, the copolymer produced will tend to be highly porous. Accordingly, the polymer is usually used in the range of 1 to 100% by weight, preferably 2 to 30% to the monomer mixture.

In the process of the present invention, a catalyst may be employed as a reaction initiator. Suitable catalysts are those which are generally used in vinyl polymerization reactions, for example, benzoyl peroxide, lauroyl peroxide, tertiary butyl peroxide, azobisisobutylonitrile, etc. In the present invention, either block polymerization, in which the above described monomers are charged in an appropriate form, or suspension polymerization, in aqueous medium may be employed. In carrying out suspension polymerization, a suspension stabilizer is preferably added to the reaction system. Suitable such suspension stabilizers are polyvinyl alcohol, sodium polymethacrylate, sodium polyacrylate, calcium carbonate, calcium sulfate, and starch, etc.

The polymerization reaction temperature is usually 60° to 90° C. at atmospheric pressure, although it can be above those temperatures at which free radicals of the initiator are formed.

Subsequently, the copolymer so obtained is extracted a suitable solvent which is capable of dissolving the linear polymer which had been added during the polymerization, so as to remove this polymer. It is preferable, although not essential, to use the same extracting solvent as used in the polymerization. The extraction may be carried out by either Soxhlet's method or by a batch extraction.

The reaction conditions can therefore be freely selected over wide ranges, and the resulting copolymer can have a range of possible physical characteristics simply by varying the amount of polymer added, its molecular weight, etc., and the amount of solvent used. In general, the surface area of the copolymer can be increased by increasing the quantity of solvent used, and the porosity can be increased by increasing the amount of linear polymer and its molecular weight. Further, the polymer can, of course, be varied in physical properties by varying the amount of polyvinyl monomer used.

The relationship between the amount of raw materials used and the physical properties of the copolymer produced is shown in the following embodiment, using acrylonitrile as the monovinyl cyanide monomer; technical divinyl benzene containing about 44% of ethylvinylbenzene and 56% divinyl benzene, as the polyvinyl monomer; polystyrene or polyvinyl acetate as the polymer added; and toluene, as the swelling solvent, as follows:

TABLE 1

| Number | Monomer composition, percent | | | | |
|---|---|---|---|---|---|
| | Acrylonitrile | DVB | EVB | Toluene | Polystyrene |
| 1 | 29 | 40 | 31 | 100 | 0 |
| 2 | 29 | 40 | 31 | 0 | 5 |
| 3 | 29 | 40 | 31 | 100 | 5 |
| 4 | 29 | 40 | 31 | 100 | 8 |
| 5 | 29 | 40 | 31 | 100 | a 5 | a Polyvinylacetate.

TABLE 1—Continued
PHYSICAL PROPERTY OF COPOLYMER PRODUCED

| Number | Surface area, m.²/g.-polymer | Pore volume, cc./g.-polymer |
|---|---|---|
| 1 | 12.0 | 0.13 |
| 2 | 8.0 | 0.10 |
| 3 | 180.0 | 0.70 |
| 4 | 130.0 | 0.20 |
| 5 | 190.0 | 0.80 |

NOTE (1) The amounts of acrylonitrile, divinyl benezne (DVB), and ethylvinylbenzene (EVB) are shown with the respective weight percentage in the mixture of total monomers.
(2) The amounts of toluene, polystyrene and polyvinyl acetate are shown with the respective weight percentage to the mixture of total monomers.
(3) The surface area is shown with a value measured by the nitrogen gas adsorption method (flowing type) using a device of SA–200 type manufactured by Shibata Scientific Devices Industries, Ltd.
(4) The pore volume is shown with a value measured by mercury impregnation with pressure (volume of pores present in 1 g. of the copolymer), using a device of 65A type manufactured by Carlo Erba Co. (Italy).
(5) The viscometric average molecular weight is 32,000 for polystyrene and 17,200 for polyvinyl acetate.

As described above, the copolymers prepared by the process of the present invention are far superior to those prepared by carrying out the polymeization separated with a swelling agent or a linear polymer, in that the copolymers of the present invention have a much greater surface area and a far greater porosity.

Therefore, the copolymers of the present invention are extremely useful as adsorbents. It should also be noted that whereas copolymers, formed from styrene and divinyl benzene, which are non-polar monovinyl monomers, show a strong adsorptivity for non-polar substances, the copolymer obtained by the present invention shows a strong adsorptivity for polar substances. Therefore, the copolymers obtained by the present invention provide a particularly effective adsorbent for removal, separation and refinement of polar substances existing in non-polar substances. Further, the narrow distribution of pore radii in the copolymers obtained by the present invention allows, of course, the application of these copolymers to such uses as gel filtration, by appropriate choice of the pore radius.

Copolymers can be produced having pore radii of between 25 to 5,000 A., preferably 50 to 2,000 A., and surface area of 10 to 1,000 m.²/g., preferably 30 to 150 m.²/g., preferably 30 to 150 m.²/g., and pore volume of 0.1 to 1.4 cc./g., preferably 0.2 to 1.0 cc./g., and hence can be used as fillers for gel permeation chromatography. These copolymers demonstrate improved separation capabilities, since, in addition to having their own polarity, they exhibit excellent molecular sieving effect due to their uniform pore systems. Furthermore, these copolymers will not be solvent swollen by those solvents used for changing the volume, nor will they be broken up by the head pressure caused by high velocity flowing down treating solutions. These copolymers can therefore be used with higher velocity flowing liquids, and are excellent for practical application.

While the present invention will further be explained by reference to certain specific examples, it is to be understood that the present invention should not be construed as being limited to these examples, unless otherwise specified.

EXAMPLE 1

A homogeneous mixed solution, consisting of 29 g. acrylonitrile, 71 g. technical divinyl benzene (containing 44% ethylvinylbenzene and 56% divinyl benzene), 100 g. toluene, 5 g. polystyrene (viscometric average molecular weight 32,000) and 1 g. benzoyl peroxide, was charged into an aqueous solution of 20 g. sodium chloride and 0.5 g. market grade polyvinyl alcohol dissolved in 500 g. water. After sufficient stirring, a homogeneous dispersion of monomer phase was formed and the polymerization was carried out by heating at 80° C. for 8 hours while introducing nitrogen gas. The resulting copolymer particles were filtered, rinsed with water and the solvent (toluene) and adhering water removed by heating. The dried copolymer thus obtained was added to about 5 times its amount of toluene (by volume). The resulting mixture was kept at the ambient temperature for 4 hours, with stirring, and polystyrene was removed by extraction. The resulting copolymer was filtered, rinsed with toluene, and then dried. The copolymer (I) thus prepared was in the form of perfect white and opaque spheres. The yield was 85 g. The surface area and the pore volume of the copolymer (I) were 180 m.$^2$/g. and 0.70 cc./g., respectively. For the sake of comparison, another copolymer (II) was prepared by the above process, except that toluene was not added in the polymerization. The polymer (II) was found to have a surface area of 8 m.$^2$/g. and a pore volume of 0.10 cc./g. A further copolymer (III) was prepared by the above process, except that polystyrene was not added, and had a surface area of 12.0 m.$^2$/g. and a pore volume of 0.13 cc./g. In the above examples, the surface area and the pore volume of each copolymer were measured by the same method as that used for the measurements cited in Table 1. A copolymer prepared by the above process, except that polystyrene was replaced with polyvinyl acetate (viscometric molecular weight 17,200), had a surface area of 190 m.$^2$/g. and a pore volume of 0.80 cc./g.

EXAMPLE 2

The same operations as those described in Example 1, except for the use of 45 g. acrylonitrile, 55 g. technical divinyl benzene (purity 56%), 50 g. toluene and 3.5 g. polystyrene (viscometric average molecular weight 17,000) yielded 89 g. of a polymer in the form of perfect white and opaque spheres. The polymer had a surface area of 67.3 m.$^2$/g. and a pore volume of 0.84 cc./g.

EXAMPLE 3

The same operations as those desribed in Example 1, except for the use of 50 g. acrylonitrile, 50 g. ethylene glycol dimethacrylate, 100 g. toluene and 5 g. polystyrene (viscometric average molecular weight 32,000) yielded 83 g. of a polymer in the form of perfect white and opaque spheres. The polymer had a surface area of 81.0 m.$^2$/g. and a pore volume of 0.88 cc./g.

EXAMPLE 4

The same operations as those described in Example 1, except for the use of 45 g. acrylonitrile, 55 g. technical divinyl benzene (purity 56%), 100 g. toluene and 5 g. polystyrene (viscometric average molecular weight 17,000) yielded 89 g. of a polymer in the form of perfect white and opaque spheres. The polymer had a surface area of 105.8 m.$^2$/g. and a pore volume of 0.346 cc./g.

As described above, copolymers prepared according to the process of the present invention are extremely excellent in their porosity.

Reference 1

Separation of n-hexane from hexene-1.

The copolymer (I) prepared by the process as described above was used for separating n-hexane from hexene-1.

For the sake of comparison, a coplymer (IV) prepared by the same process as applied to the preparation of the copolymer (I) except for the substitution of styrene monomer for acrylonitrile was used also for the separating test. The copolymer (IV) had a surface area of 170 m.$^2$/g. a pore volume of 0.35 cc./g.

The method for separation:

Each of the porous copolymers was charged into a column of 0.7 cm. diameter and 12 cm. height, so as to provide a layer of copolymers of 7 cm. in height.

1 ml. of n-hexane and 1 ml. of hexene-1 were supplied to the top of the column. While methanol was being supplied at room temperature from the top of the column at the rate of about 1 ml./min., the effluent was collected by a fraction collector of 5 ml. capacity. The collected effluent was analyzed by gas chromatography. (Type GC-IC, manufactured by Shimazu Co.) The result is shown in FIG. 1.

The ordinate shows the amount of flow of hydrocarbons separated by the use of the copolymer of the present invention. The abscissa refers to the number of fraction.

As is clearly shown in the above examples, the copolymers obtained by the present invention are very effective in removing substances of greater polarity contained among substances of lesser polarity because of their adsorptivity to substances of greater polarity. Furthermore, the copolymers of the present invention have a considerable industrial advantage, compared with synthetic zeolites, in that the present copolymers can have physical properties varying over a wider range and can be manufactured at a lower cost.

Reference 2

Separation of sugar using a gel permeation chromatography (type GPC-IA, manufactured by Shimazu Co.).

Figure 2:
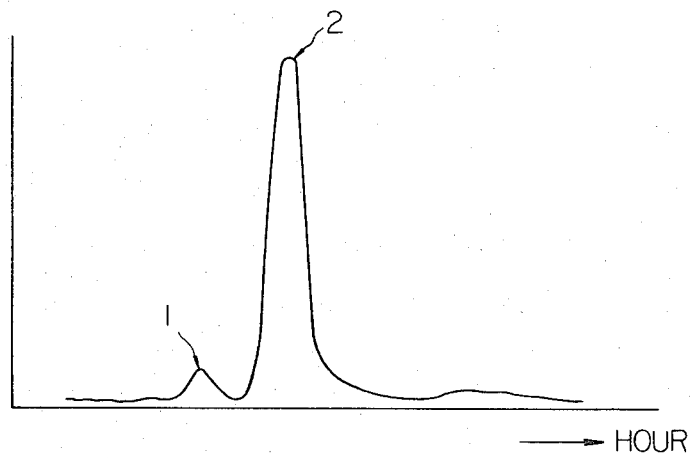

About 70 ml. of copolymer particles (particle diameter 50 to 100μ) were charged into a column of 9 mm. diameter and 1213 mm. in height. 0.1 ml. of an aqueous solution containing 0.142 mg. soluble starch, 0.109 mg. raffinose, 0.202 mg. maltose and 0.105 mg. glucose was supplied to the top of the column, and pure water was poured at 60° C. under a head pressure of 4 kg./cm.$^2$. The result is shown in FIG. 2, in which the first peak is the peak for soluble starch and the second peak is the peak for other monosaccharides. From this result, it has been found that the separation on the basis of the differences of molecular sizes is effectively carried out.

Having now fully described the invention, it will be apparent to one of ordinary skill in the art that many changes and modifications can be made thereto without departing from the spirit or scope of the invention. Accordingly,

What is claimed as new and desired to be secured by Letters Patent is:

1. A process for preparing a cyano-group-containing cross-linked porous copolymer characterized by polymerizing a monovinyl monomer selected from the group consisting of monovinyl cyanide, and monovinylidene cyanide with a polyvinyl monomer, in the presence of an organic solvent which is inert to these monomers and which functions both as a solvent for said monomers and as a swelling agent for the resulting copolymer and in the presence of a linear monovinyl polymer which forms a homogeneous liquid phase with said monomers and said solvent, and thereafter extracting the linear polymer from the resulting copolymer to recover a porous cyano-group-containing cross-linked copolymer.

2. The process of claim 1, wherein said monovinyl monomer is acrylonitrile or methacrylonitrile.

3. The process of claim 1, wherein said polyvinyl monomer is selected from the group consisting of divinylbenzene, divinyl-toluene, divinylnaphthalene, trivinylbenzene, ethylene glycol diacrylate and ethylene glycol dimethacrylate.

4. The process of claim 1, wherein said organic solvent is an aromatic hydrocarbon or a halogenated hydrocarbon.

5. The process of claim 1, wherein said linear monovinyl polymer is selected from the group consisting of polystyrene, polymethylstyrene, polyvinylacetate, polymethacrylate and polymethylmethacrylate.

6. The process of claim 1, wherein the amount of said polyvinyl monomer is 20 to 50% based on the total weight of vinyl monomers.

7. The process of claim 1, wherein the amount of said organic solvent used is 20 to 300% based on the total volume of vinyl monomers.

8. The process of claim 1, wherein the degree of polymerization of said linear monovinyl polymer is 50 to 5,000.

9. The process of claim 1, wherein the amount of said linear monovinyl polymer used is 1 to 100% based on the total weight of vinyl monomers.

10. A process for preparing a cyano-group-containing cross-linked porous copolymer which comprises polymerizing a monovinyl monomer selected from the group consisting of monovinyl cyanide and monovinylidene cyanide, with a polyvinyl monomer, in the presence of an aromatic hydrocarbon and in the presence of a linear monovinyl polymer which is selected from the group consisting of polystyrene, polymethylstyrene, polyvinylacetate, polymethylacrylate, and polymethylmethacrylate, and extracting the linear polymer from the resulting copolymer to recover a porous cyano-group-containing cross-linked copolymer.

References Cited

UNITED STATES PATENTS

| | | | |
|---|---|---|---|
| 3,509,078 | 4/1970 | Roubinek et al. | 260—2.5 M |
| 3,220,960 | 11/1965 | Wichterle | 260—2.5 M |

FOREIGN PATENTS

| | | | |
|---|---|---|---|
| 1,918,399 | 12/1970 | Germany | 260—2.5 M |

WILBERT J. BRIGGS, Sr, Primary Examiner

U.S. Cl. X.R.

210—500, 503; 260—2.5 B, 33.6 UA, 33.8 UA, 85.5 S, 85.5 HC, 881, 885, 886